United States Patent
Kikuchi

(10) Patent No.: US 11,945,328 B2
(45) Date of Patent: Apr. 2, 2024

(54) METHOD AND SYSTEM OF CONTROLLING CHARGEABLE AND DISCHARGEABLE POWER AMOUNTS OF CHARGING AND DISCHARGING APPARATUS GROUP IN POWER GRID

(71) Applicant: TOYOTA JIDOSHA KABUSHIKI KAISHA, Toyota (JP)

(72) Inventor: Satoshi Kikuchi, Hadano (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 431 days.

(21) Appl. No.: 17/493,967

(22) Filed: Oct. 5, 2021

(65) Prior Publication Data

US 2022/0126719 A1 Apr. 28, 2022

(30) Foreign Application Priority Data

Oct. 25, 2020 (JP) ................................. 2020-178498

(51) Int. Cl.
*B60L 53/62* (2019.01)
*B60L 53/51* (2019.01)
(Continued)

(52) U.S. Cl.
CPC ............... *B60L 53/62* (2019.02); *B60L 53/51* (2019.02); *B60L 53/52* (2019.02); *B60L 53/67* (2019.02); *B60L 55/00* (2019.02)

(58) Field of Classification Search
CPC .......... B60L 53/62; B60L 53/67; B60L 53/51; B60L 53/52; B60L 55/00
(Continued)

(56) References Cited

U.S. PATENT DOCUMENTS 11,479,141 B2 * 10/2022 Kazuno ................ H01M 10/44
2016/0028253 A1 1/2016 Yamaguchi et al.
(Continued)

FOREIGN PATENT DOCUMENTS

JP 2015-061496 A 3/2015
JP 2016-099955 A 5/2016
(Continued)

*Primary Examiner* — Nathaniel R Pelton
(74) *Attorney, Agent, or Firm* — Finnegan, Henderson, Farabow, Garrett & Dunner, LLP

(57) ABSTRACT

In a power transmission and distribution system, each charging and discharging apparatus includes a communication unit configured to receive information on charging and discharging requirement amounts of at least one other charging and discharging apparatus. In each charging and discharging apparatus, according to an average agreement calculation of a multi-agent system, agreement values obtained by dividing, by the number of agents, a total of charging requirement amounts and a total of discharging requirement amounts of all charging and discharging apparatuses, respectively, is calculated using own charging and discharging requirement amounts and information on the charging and discharging requirement amounts of the other charging and discharging apparatus acquired by the communication unit, and a limit amount on a charging execution amount or a discharging execution amount of each charging and discharging apparatus is controlled based on the agreement values.

20 Claims, 4 Drawing Sheets

(51) Int. Cl.
B60L 53/52 (2019.01)
B60L 53/67 (2019.01)
B60L 55/00 (2019.01)

(58) Field of Classification Search
USPC .......................................................... 320/109
See application file for complete search history.

(56) References Cited

U.S. PATENT DOCUMENTS

2016/0185246 A1   6/2016  Paul
2020/0055418 A1*  2/2020  Bridges .................... B60L 55/00
2021/0370791 A1* 12/2021  Ehara ....................... B60L 53/67

FOREIGN PATENT DOCUMENTS

JP      2020-078162 A      5/2020
WO   WO 2014-141315 A1   9/2014

* cited by examiner

METHOD AND SYSTEM OF CONTROLLING CHARGEABLE AND DISCHARGEABLE POWER AMOUNTS OF CHARGING AND DISCHARGING APPARATUS GROUP IN POWER GRID

CROSS-REFERENCE TO RELATED APPLICATION

This application claims priority to Japanese Patent Application No. 2020-178498 filed on Oct. 25, 2020, incorporated herein by reference in its entirety.

BACKGROUND

1. Technical Field

The present disclosure relates to a method and a system of controlling charging and discharging amounts of a charger-discharger connected to a power grid in a power supply system or a power transmission and distribution system, and more specifically, to a method and a system that control amounts of power that can be charged and discharged by each charger-discharger in a configuration in which a storage battery is charged and discharged by each of a plurality of chargers-dischargers connected to a local power grid, such as a micro grid. A storage battery connected to each charger-discharger may be mounted on a mobile object, such as an electrically driven vehicle, and may be any storage battery detachable from each charger-discharger.

2. Description of Related Art

With the widespread use of vehicles having large-capacity storage batteries mounted thereon, such as electric vehicles or hybrid vehicles (hereinafter collectively referred to as "electrically driven vehicles"), charging and discharging apparatuses (Electric Vehicle Power Stations (EVPSs)) used for charging and discharging storage batteries of electrically driven vehicles have been installed in various facilities such as towns, houses, stores, and factories. The charging and discharging apparatus for the storage battery of the electrically driven vehicle has a configuration in which the charger-discharger thereof is connected to the power grid. The charging and discharging apparatus is configured to, in a case where the electrically driven vehicle arrives at the charging and discharging apparatus and the storage battery thereof is connected to the charger-discharger, receive power from the power grid when charging the storage battery, and supply power to the power grid when discharging the storage battery. In such a charging and discharging apparatus, the storage battery of the electrically driven vehicle is charged and discharged depending on the situation of the electrically driven vehicle. Therefore, since power of the power grid may become unstable when a power amount flowing into and from a power grid is not limited, various configurations used for controlling chargeable and dischargeable power amounts of the charging and discharging apparatus have been proposed. For example, Japanese Unexamined Patent Application Publication No. 2015-61496 proposes a technology in which, in a charging station in which chargers used for charging a plurality of electrically driven vehicles and a plurality of fixation-type storage batteries are connected to a system power grid, a charging management apparatus that acquires information on the electrically driven vehicle, information on the maximum output power of the fixation-type storage battery and the like, information on power supply from the system power grid that can be used for charging, and charger information on the maximum output power of the charger and the like, calculates a preliminary charging amount indicating an amount of charging with which each electrically driven vehicle can be charged at the charging station, and determines a charging condition such that a difference between a maximum charging amount of each electrically driven vehicle and the preliminary charging amount is smaller, with a charging time of each electrically driven vehicle and the maximum output power of the charger respectively maintained in certain ranges while satisfying a certain constraint condition. Further, WO 2014141315 proposes a charging time adjusting apparatus that acquires a planned power supply amount of an electric system that includes a charger to be connected to an electric vehicle at the time of charging the electric vehicle and sets a charging time so as to charge the electric vehicle using the charger during a period of time when the planned power supply amount exceeds a threshold value, and a charging system including a prediction apparatus that calculates a power supply amount to be supplied by renewable energy and the charging time adjusting apparatus.

SUMMARY

The power supply system or the power transmission and distribution system in which such a charging and discharging apparatus is also installed has been only configured to distribute power from a large-scale power plant to a consumer in each area through a large-scale transmission and distribution power grid covering a wide area (a form of centralized-type power generation), but due to recent advances in the renewable energy power generation technology, such as solar power generation and wind power generation, as power transmission and distribution system, a configuration is proposed and executed in which a power grid, referred to as a micro grid, transmits and distributes power obtained from a small-scale power generation facility (a distribution-type power source) to a consumer in a relatively small area. In such a micro grid, there is typically a provider (a power retailer) that manages the supply and demand of power within the micro grid, and the micro grid is connected, through the provider, to a system power grid (a centralized-type power grid that supplies power from the large-scale power plant) and configured to adjust for surplus or shortage of the power amount within the micro grid. In other words, the provider is configured to, when a power amount obtained from the power generation facility within the micro grid is less than a power amount consumed or stored within the micro grid, receive (purchase) power from the system power grid by the power shortage amount, and when the supplied power amount exceeds the demand power amount, supply (sell) power to the system power grid by the power surplus amount.

In such a micro grid, the provider manages the power amount flowing in the power grid of the micro grid so as to maintain the stability of power in the power grid and not to influence the stability of power of the system power grid that is received and supplied by the micro grid. Specifically, for example, the provider sets in advance a planned value for a power amount supplied to the micro grid (a sum of a power generation amount generated by the power generation facility within the micro grid and a power amount received from the system power grid: a feeding power amount), and sets, as one of conditions to be managed (a management condition), a condition in which a difference between an actual feeding power amount in the micro grid and the planned value is within a predetermined error range. Further, for that purpose, as an additional management condition, the provider also sets a condition in which a supply-demand balance, that is, a ratio of a power amount consumed within the micro grid (a sum of the power amount consumed by various facilities (a demand power amount) and a charged power amount of the storage battery) to a power amount discharged to the micro grid (a sum of the feeding power amount and a discharged power amount from the storage battery; a supply power amount) is within a predetermined ratio range. In other words, in the above example, in the micro grid, the management conditions are: (1) the difference between the feeding power amount and the planned value is within the predetermined error range, and (2) the supply-demand balance is within the predetermined ratio range. Then, if a state within the micro grid deviates from such management conditions, system instability or payment of a penalty for imbalance may occur.

The power amount flowing in the micro grid is also required to be managed in a case where a charging and discharging apparatus is installed within the micro grid and a storage battery of an electrically driven vehicle is charged and discharged. Therefore, when the storage battery is charged and discharged by the charging and discharging apparatus, it is desirable to set a limit on a charging amount or a discharging amount of the storage battery in each charging and discharging apparatus so as not to influence the stability of power of the system power grid or to satisfy the management conditions. Since chargeable and dischargeable power amounts of each charging and discharging apparatus vary depending on charging and discharging amounts required in charging and discharging apparatuses connected to the micro grid, it is desirable to set a limit amount on the charging amount or the discharging amount depending on the chargeable and dischargeable power amounts of each charging and discharging apparatus. In this regard, charging and discharging amounts required by the storage batteries of the electrically driven vehicles (charging requirement amounts, discharging requirement amounts) of the charging and discharging apparatus are different for each charging and discharging apparatus, and fluctuate every time. Further, since the storage battery of the electrically driven vehicle is frequently attached and detached, the charging requirement amounts and the discharging requirement amounts (hereinafter, collectively referred to as "charging and discharging requirement amounts") of all the charging and discharging apparatuses within the micro grid easily fluctuate. In that case, information on attachment and detachment states and the charging and discharging requirement amounts of the storage batteries of the electrically driven vehicles for the chargers-dischargers of all the charging and discharging apparatuses within the micro grid is collected by a single management device (an aggregator), such as a provider, and when the management device adjusts limit amounts of the charging and discharging in each charging and discharging apparatus, a processing load and a communication load on the management device increase with an increase in the number of charging and discharging apparatuses installed within the micro grid, and it is expected that the number of such charging and discharging apparatuses will significantly increase in the future (500,000 to 1 million units) with the spread of electrically driven vehicles. Therefore, when a single management device tries to manage the limit amounts of the charging and discharging in each of the large number of charging and discharging apparatuses every time, the processing load on the management device may become remarkably large and a processing speed may also become a problem. Further, since the information on the charging and discharging requirement amounts of the storage battery of the electrically driven vehicle connected to the charger-discharger of each charging and discharging apparatus can be personal information of an owner thereof, it is desirable to ensure confidentiality of the information. However, in a case in which the information on the chargers-dischargers of all the charging and discharging apparatuses within the micro grid is collected in a single management device, a burden of confidentiality management of the information on the management device also increases. Due to the above circumstances, when the information on attachment and detachment states and the charging and discharging requirement amounts of the storage battery of the electrically driven vehicle for the charger-discharger of each charging and discharging apparatus within the micro grid is not collected in the single management device, and it is possible to set the limit amount of the charging and discharging in each charging and discharging apparatus and to control the charging and discharging amounts in each charging and discharging apparatus according to the limit amounts, it is very advantageous.

Thus, when a plurality of charging and discharging apparatuses, such as EVPSs, is installed in a power grid, such as the micro grid, in a configuration used for controlling chargeable and dischargeable power amounts in the charging and discharging apparatus, the present disclosure provides a method or an apparatus capable of setting the limit amounts of the charging and discharging of each charging and discharging apparatus without collecting, in the single management device, information on attachment and detachment states or charging and discharging requirement amounts of storage batteries for each charging and discharging apparatus or of controlling chargeable and dischargeable power amounts of each charger-discharger such that the charging and discharging amounts of the charger-discharger is not unlimited or a management condition required in the power grid is satisfied in order to maintain power stability of the power grid itself or to avoid influencing the power stability of a system power grid.

However, regarding the above point, as already described, with the introduction of a distribution-type power source to a power transmission and distribution system, introduction of a theory of a distribution controller of a multi-agent system in a control of each power source or power consumption has been proposed (see, for example, Japanese Unexamined Patent Application Publication No. 2016-99955 and Japanese Unexamined Patent Application Publication No. 2020-78162). For example, according to an average agreement control of a multi-agent system, simply by controlling any state quantity of each agent within the system while referring to a corresponding state quantity of an adjacent agent, it is possible to match any state quantity of each agent with an average value of initial values of state quantities of all agents within the system. Further, when the theory of the average agreement control of the multi-agent system is used, simply by referring to a calculated value of the state quantity of the adjacent agent even without actually controlling the state quantity of each agent, it is possible for each agent to know the average value of the initial values of the state quantities of all the agents within the system. Therefore, as described above, when the theory of the average agreement control of the multi-agent system is used, in a system in which a plurality of charging and discharging apparatuses, such as EVPSs, is connected to a power grid, such as a micro grid, simply by referring to the corresponding information of the adjacent charging and discharging apparatus about information, such as the charging and discharging requirement amounts, it is possible for each charging and discharging apparatus to know the average value of the charging and discharging requirement amounts of all the charging and discharging apparatuses within the power grid, and possible to set the limit amounts of charging and discharging of each charging and discharging apparatus or to control the chargeable and dischargeable power amounts based on such average value. In the present disclosure, this perception is utilized.

A first aspect of the present disclosure is a method of controlling a chargeable power amount and a dischargeable power amount in each of charging and discharging apparatuses in a power transmission and distribution system. The power transmission and distribution system includes a power grid and a plurality of charging and discharging apparatuses connected to the power grid. Each of chargers and dischargers of the charging and discharging apparatuses is configured to, when being connected to a storage battery, charge the storage battery with power from the power grid or discharge the storage battery by transferring power to the power grid. The power transmission and distribution system includes, in each of the charging and discharging apparatuses, a communication unit configured to receive information on a charging requirement amount and a discharging requirement amount of at least one other charging and discharging apparatus. The method includes a process for calculating, in each of the charging and discharging apparatuses, according to an average agreement calculation of a multi-agent system having each of the charging and discharging apparatuses as an agent, agreement values obtained by dividing, by the number of agents, a total of the charging requirement amounts and a total of discharging requirement amounts of all of the charging and discharging apparatuses connected to the power grid, respectively, using an own charging requirement amount and an own discharging requirement amount and information on the charging requirement amount and the discharging requirement amount of the at least one other charging and discharging apparatus acquired by the communication unit, and a process for controlling, in each of the charging and discharging apparatuses, a limit amount on a charging execution amount and a limit amount on a discharging execution amount of each of the charging and discharging apparatuses based on the agreement values of the charging requirements amounts and the discharging requirement amounts.

In the above configuration, the "power grid" may refer to a power grid used for transmitting and distributing power generated by a distribution-type power source or power received from a system power grid to a consumer within a relatively small area, such as the micro grid. The "charging and discharging apparatus" may refer to an apparatus having a charger-discharger, such as the EVPS, and configured to, when a storage battery mounted on an electrically driven vehicle and the like is connected to the charger-discharger, charge the storage battery with power from the power grid or discharge the storage battery by transferring power to the power grid in response to a request of a user of the storage battery while considering the state of charge (SOC) of the storage battery. The "charging requirement amount" and the "discharging requirement amount" refer to power amounts of charging and discharging required to be executed by each charging and discharging apparatus, respectively, the "charging execution amount" and the "discharging execution amount" refer to power amounts of charging and discharging to be actually executed by each charging and discharging apparatus, respectively, and the "limit amount on the charging execution amount" and the "limit amount on the discharging execution amount" are upper limits on the chargeable and dischargeable power amounts, respectively. The "average agreement calculation of a multi-agent system" is a calculation for calculating, in a multi-agent system having a configuration in which each of a plurality of agents changes its own state quantity while referring to any state quantity of an adjacent agent, an agreement value of the state quantities of all the agents when the state quantities of all the agents are agreed (that is, when a convergence condition in which absolute values of differences among the state quantities of all the agents are lower than a certain minute amount is satisfied) by changing an own state quantity of each agent such that a difference between the own state quantity of each agent and the state quantity of the adjacent agent converges to zero, and is a calculation by which the agreement value becomes the average value of initial values of the state quantities of all the agents (that is, a value obtained by dividing a total of the initial values of the state quantities of all the agents by the number of agents). In other words, the agents in the multi-agent system compose an undirected graph. In the case of the method of the present disclosure, the initial value of the state quantity of each agent in the average agreement calculation is the charging requirement amount and the discharging requirement amount for each charging and discharging apparatus. The agreement values are values obtained by dividing, by the number of agents, the total of the charging requirement amounts and the total of the discharging requirement amounts of all charging and discharging apparatuses, respectively, and when the number of agents matches the number of charging and discharging apparatuses, the agreement values are the average value of the charging requirement amounts and the average value of the discharging requirement amounts, respectively (however, as described below, in the average agreement calculation of the multi-agent system, the management device of the power grid may also be set as an agent, and in that case, the agreement values are values proportional to the average value of the charging requirement amounts and the average value of the discharging requirement amounts, respectively). Average agreement calculation processing of the multi-agent system may be executed at every predetermined time interval that may be arbitrarily set, every time the number of charging and discharging apparatuses or the number of charging and discharging apparatuses connected to storage batteries in the power grid is changed, or every time the charging requirement amount or the discharging requirement amount of the charging and discharging apparatus is changed.

In the above method of the present disclosure, as understood from the configuration, in each of the plurality of charging and discharging apparatuses connected to the power grid, the values obtained by dividing, by the number of agents, the total of the charging requirement amounts and the total of the discharging requirement amounts of all of the charging and discharging apparatuses, respectively, are obtained as the agreement values and the limit amount on the charging execution amount and the limit amount on the discharging execution amount of each of the charging and discharging apparatuses are controlled based on such agreement values. Here, since the agreement value of the charging requirement amounts and the agreement value of the discharging requirement amounts are values proportional to the total of the charging requirement amounts and the total of the charging requirement amounts of the charging and discharging apparatuses currently connected to the storage batteries, respectively, it is possible to recognize the information on the charging amount and the discharging amount currently required from a group of charging and discharging apparatuses in the power grid by referring to the agreement values in each charging and discharging apparatus. As such, it is possible to control the charging execution amount or the discharging execution amount such that the charging amount or the discharging amount of the charging and discharging apparatus is not unlimited or the management condition required in the power grid is satisfied. Then, in such a configuration, it is important that since each charging and discharging apparatus can learn the information on the total of the charging requirement amounts and the total of the discharging requirement amounts without accumulating the information on the charging requirement amounts or the discharging requirement amounts of all of the charging and discharging apparatuses in a single management device and the like, a problem of slowing down of the processing speed due to the enormous calculation load on one management device and the like does not occur, and the problem of an increase in the burden of confidentiality management of the information on the charging requirement amounts or the discharging requirement amounts of all of the charging and discharging apparatuses is also removed even when the number of charging and discharging apparatuses connected to the power grid is increased.

In the first aspect, in the process for controlling the limit amount on the charging execution amount and the limit amount on the discharging execution amount of each of the charging and discharging apparatuses, the limit amount on the charging execution amount of each of the charging and discharging apparatuses may be set to be smaller when the agreement value of the charging requirement amounts of all of the charging and discharging apparatuses is large than when the agreement value of the charging requirement amounts of all of the charging and discharging apparatuses is small. Then, the limit amount on the charging execution amount of each of the charging and discharging apparatuses may be set to be larger when the agreement value of the discharging requirement amounts of all of the charging and discharging apparatuses is large than when the agreement value of the discharging requirement amounts of all of the charging and discharging apparatuses is small.

In the first aspect, in the process for controlling the limit amount on the charging execution amount and the limit amount on the discharging execution amount of each of the charging and discharging apparatuses, the limit amount on the discharging execution amount of each of the charging and discharging apparatuses may be set to be larger when the agreement value of the charging requirement amounts of all of the charging and discharging apparatuses is large than when the agreement value of the charging requirement amounts of all of the charging and discharging apparatuses is small. Then, the limit amount on the discharging execution amount of each of the charging and discharging apparatuses may be set to be smaller when the agreement value of the discharging requirement amounts of all of the charging and discharging apparatuses is large than when the agreement value of the discharging requirement amounts of all of the charging and discharging apparatuses is small.

In the first aspect, in the process for controlling the limit amount on the charging execution amount and the limit amount on the discharging execution amount of each of the charging and discharging apparatuses, the limit amount on the charging execution amount and the limit amount on the discharging execution amount of each of the charging and discharging apparatuses may be controlled such that a management condition for a power amount flowing in the power grid is satisfied.

In the first aspect, the power transmission and distribution system may include a management device configured to manage the power amount in the power grid. The management device may set a planned value of a feeding power amount fed into the power grid from at least one of a power generation facility or a system power grid that supplies power to the power grid. In the process for controlling the limit amount on the charging execution amount and the limit amount on the discharging execution amount of each of the charging and discharging apparatuses, the limit amount on the charging execution amount and the limit amount on the discharging execution amount of each of the charging and discharging apparatuses may be controlled such that a management condition in which the feeding power amount is set with respect to the planned value is satisfied. The management device manages the feeding power amount such that the management condition in which the feeding power amount is set with respect to the planned value, for example, a condition in which a difference between the feeding power amount and the planned value is kept within an appropriately set predetermined error range, is satisfied.

In the first aspect, the management device may detect a demand power amount in the power grid. In the process for controlling the limit amount on the charging execution amount and the limit amount on the discharging execution amount of each of the charging and discharging apparatuses, the limit amount on the charging execution amount and the limit amount on the discharging execution amount of each of the charging and discharging apparatuses may be controlled such that a management condition set for the feeding power amount and the demand power amount is satisfied. Upon detecting the demand power amount within the power grid, that is, the power amount consumed in various facilities within the power grid, the management device manages the feeding power amount such that the management condition set for the feeding power amount and the demand power amount, for example, a condition in which a supply and demand balance in the power grid is kept within an appropriately set predetermined error range is satisfied. It should be noted that the limit amount on the charging execution amount and the limit amount on the discharging execution amount of each of the charging and discharging apparatuses may be larger than the charging requirement amount or the discharging requirement amount of each charging and discharging apparatus due to the feeding power amount and the demand power amount in the power grid.

In the first aspect, in a process for calculating agreement values of the charging requirement amounts and the discharging requirement amounts of all of the charging and discharging apparatuses connected to the power grid, the management device may be used as the agent in the average agreement calculation of the multi-agent system. The management device itself does not have the charging requirement amount or the discharging requirement amount, but when the management device in the average agreement calculation processing of the multi-agent system is set as an agent in the same manner as the charging and discharging apparatus, the management device can also recognize the agreement values of the charging requirement amounts and the discharging requirement amounts, that is, the information on the total of the charging requirement amounts and the total of the discharging requirement amounts. In this case, the agreement values obtained by the average agreement calculation of the multi-agent system are obtained by dividing the total of the charging requirement amounts or the total of the discharging requirement amounts by the number of charging and discharging apparatuses plus one, respectively.

In the first aspect, the power transmission and distribution system may include a communication unit having a configuration in which the management device sends information on the planned value of the feeding power amount and a demand power amount to at least one charging and discharging apparatus, and a communication unit configured to receive the information on the planned value of the feeding power amount and the demand power amount from at least one other charging and discharging apparatus, in each of the charging and discharging apparatuses. The method may include a process for calculating, according to an average agreement calculation of a multi-agent system having each of the charging and discharging apparatuses and the management device as the agents, agreement values obtained by dividing planned values of the feeding power amounts and the demand power amounts of each of the charging and discharging apparatuses and the management device by the number of agents, respectively. In the process for controlling the limit amount on the charging execution amount and the limit amount on the discharging execution amount of each of the charging and discharging apparatuses, in each of the charging and discharging apparatuses, the limit amount on the charging execution amount and the limit amount on the discharging execution amount of each of the charging and discharging apparatuses may be controlled based on the agreement values of the charging requirement amounts and the discharging requirement amounts and the agreement values of the planned values of the feeding power amounts and the demand power amounts.

In the first aspect, each charging and discharging apparatus does not maintain the information on the planned values of the feeding power amount and the demand power amount in the power grid before the average agreement calculation of the multi-agent system, but can learn the agreement values of the planned value of the feeding power amounts and the demand power amounts by the average agreement calculation of the multi-agent system. Then, each charging and discharging apparatus can obtain the information on the planned value of the feeding power amount and the demand requirement amount in the power grid even without directly communicating with the management device, and thus, it is expected to be able to more accurately control the limit amount on the charging execution amount or the limit amount on the discharging execution amount of each of the charging and discharging apparatuses by further considering the planned values of the feeding power amount and the demand power amount.

As described in an embodiment below, in the first aspect, a divisor at the time of obtaining the agreement values of the charging requirement amounts and the discharging requirement amounts and the agreement values of the planned values of the feeding power amounts and the demand requirement amounts is all the number of agents, that is, the number of the charging and discharging apparatuses plus one. Therefore, at the time of determining the limit amount on the charging execution amount or the limit amount on the discharging execution amount, when the limit amount is given by a calculation of dividing one agreement value by another agreement value, since the number of charging and discharging apparatuses plus one is erased in the divisor and the divided of the calculation, in the end. (the number of charging and discharging apparatuses plus one) does not appear explicitly in the formula for giving the limit amount, and in each charging and discharging apparatus, it is possible to calculate the limit amount even without knowing the number of charging and discharging apparatuses, and thus, the communication load in the system is reduced.

In the first aspect, in the process for controlling the limit amount on the charging execution amount and the limit amount on the discharging execution amount of each of the charging and discharging apparatuses, the limit amount on the charging execution amount of each of the charging and discharging apparatuses may be set as follows:

(a charging requirement amount of each of the charging and discharging apparatuses)×(the chargeable power amount within the power grid)/(the total of the charging requirement amounts of all of the charging and discharging apparatuses within the power grid)

In the first aspect, in the process for controlling the limit amount on the charging execution amount and the limit amount on the discharging execution amount of each of the charging and discharging apparatuses, the limit amount on the discharging execution amount of each of the charging and discharging apparatuses may be set as follows;

(a discharging requirement amount of each of the charging and discharging apparatuses)×(the dischargeable power amount within the power grid)/(the total of the discharging requirement amounts of all of the charging and discharging apparatuses within the power grid)

In the power transmission and distribution system including the power grid and the plurality of charging and discharging apparatuses connected to the power grid, in the plurality of charging and discharging apparatuses connected to the power grid, the method is implemented by a system that calculates, according to the average agreement calculation of the multi-agent system, the value obtained by dividing the total of charging requirement amounts by the number of agents and the value obtained by dividing the total of discharging requirement amounts of all the charging and discharging apparatuses by the number of agents as the agreement values, and controls the chargeable power amount or the dischargeable power amount of each charging and discharging apparatus based on the agreement values. A second aspect of the present disclosure is a system of controlling a chargeable power amount and a dischargeable power amount in each of the charging and discharging apparatuses included in a power transmission and distribution system. The power transmission and distribution system includes a power grid and a plurality of charging and discharging apparatuses connected to the power grid. When being connected to a storage battery, each of chargers and dischargers of the charging and discharging apparatuses is configured to charge the storage battery with power from the power grid and discharge the storage battery by transferring power to the power grid. The power transmission and distribution system includes, in each of the charging and discharging apparatuses, a communication unit configured to receive information on a charging requirement amount and a discharging requirement amount of at least one other charging and discharging apparatus. The system includes, in each of the charging and discharging apparatuses, a requirement amount agreement value calculation unit configured to calculate, according to an average agreement calculation of a multi-agent system having each of the charging and discharging apparatuses as an agent, agreement values obtained by dividing, by the number of agents, a total of charging requirement amounts and a total of discharging requirement amounts of all of the charging and discharging apparatuses connected to the power grid, respectively, using an own charging requirement amount and an own discharging requirement amount and information on the charging requirement amount and the discharging requirement amount of the at least one other charging and discharging apparatus acquired by the communication unit and a charging and discharging limit amount control unit configured to control a limit amount on a charging execution amount and a limit amount on a discharging execution amount of each of the charging and discharging apparatuses based on the agreement values of the charging requirement amounts and the discharging requirement amounts. The requirement amount agreement value calculation unit and the charging and discharging limit amount control unit may be implemented by a control device composed of a computer provided in each charging and discharging apparatus.

In the second aspect, the charging and discharging limit amount control unit may be configured to set the limit amount on the charging execution amount of each of the charging and discharging apparatuses to be smaller when the agreement value of the charging requirement amounts of all of the charging and discharging apparatuses is large than when the agreement value of the charging requirement amounts of all of the charging and discharging apparatus is small, and set the limit amount on the charging execution amount of each of the charging and discharging apparatuses to be larger when the agreement value of the discharging requirement amounts of all of the charging and discharging apparatuses is large than when the agreement value of the discharging requirement amounts of all of the charging and discharging apparatuses is small.

In the second aspect, the charging and discharging limit amount control unit is configured to set the limit amount on the discharging execution amount of each of the charging and discharging apparatuses to be larger when the agreement value of the charging requirement amounts of all of the charging and discharging apparatuses is large than when the agreement value of the charging requirement amounts of all of the charging and discharging apparatuses is small, and set the limit amount on the discharging execution amount of each of the charging and discharging apparatuses to be smaller when the agreement value of the discharging requirement amounts of all of the charging and discharging apparatuses is large than when the agreement value of the discharging requirement amounts of all of the charging and discharging apparatuses is small.

In the second aspect, the charging and discharging limit amount control unit may be configured to control the limit amount on the charging execution amount and the limit amount on the discharging execution amount of each of the charging and discharging apparatuses such that a management condition for a power amount flowing in the power grid is satisfied.

In the second aspect, the power transmission and distribution system may include a management device configured to manage the power amount in the power grid. The management device may set a planned value of a feeding power amount fed into the power grid from at least one of a power generation facility or a system power grid that supplies power to the power grid. The charging and discharging limit amount control unit may control the limit amount on the charging execution amount and the limit amount on the discharging execution amount of each of the charging and discharging apparatuses such that a management condition in which the feeding power amount is set with respect to the planned value is satisfied.

In the second aspect, the management device may detect a demand power amount in the power grid. The charging and discharging limit amount control unit may control the limit amount on the charging execution amount and the limit amount on the discharging execution amount of each of the charging and discharging apparatuses such that a management condition set for the feeding power amount and the demand power amount is satisfied.

In the second aspect, the requirement amount agreement value calculation unit may use the management device as the agent in the average agreement calculation of the multi-agent system.

In the second aspect, the power transmission and distribution system may include a communication unit having a configuration in which the management device sends information on the planned value of the feeding power amount and a demand power amount to at least one charging and discharging apparatus, and a communication unit configured to receive the information on the planned value of the feeding power amount and the demand power amount from at least one other charging and discharging apparatus, in each of the charging and discharging apparatuses. The system may include, in each of the charging and discharging apparatuses and the management device, a feeding power amount and demand power amount agreement value calculation unit configured to calculate, according to an average agreement calculation of a multi-agent system having each of the charging and discharging apparatuses and the management device as the agents, agreement values obtained by dividing planned values of the feeding power amounts and the demand power amounts of each of the charging and discharging apparatuses and the management device by the number of agents, respectively. The charging and discharging limit amount control unit may be configured to control the limit amount on the charging execution amount and the limit amount on the discharging execution amount of each of the charging and discharging apparatuses based on the agreement values of the charging requirement amounts and the discharging requirement amounts and the agreement values of the planned values of the feeding power amounts and the demand power amounts.

In the second aspect, the charging and discharging limit amount control unit may be configured to set the limit amount on the charging execution amount of each of the charging and discharging apparatuses as follows:

> (a charging requirement amount of each of the charging and discharging apparatuses)×(the chargeable power amount within the power grid)/(the total of the charging requirement amounts of all of the charging and discharging apparatuses within the power grid)

In the second aspect, the charging and discharging limit amount control unit may set the limit amount on the discharging execution amount of each of the charging and discharging apparatuses as follows:

> (a discharging requirement amount of each of the charging and discharging apparatuses)×(the dischargeable power amount within the power grid)/(the total of the discharging requirement amounts of all of the charging and discharging apparatuses within the power grid)

Thus, in the second aspect, in the power transmission and distribution system including the power grid and the plurality of charging and discharging apparatuses connected to the power grid, using the average agreement calculation of the multi-agent system, each charging and discharging apparatus can share information on a value proportional to the total of the charging requirement amounts and the total of the discharging requirement amounts of all of the charging and discharging apparatuses connected to the power grid, recognize the limit amount on the charging execution amount and the limit amount on the discharging execution amount by referring to the information every moment, and control its own charging amount or discharging amount more appropriately. In such a configuration, it is important that each charging and discharging apparatus does not have to acquire information on the charging requirement amount and the discharging requirement amount from all the other charging and discharging apparatuses, or it is not necessary to execute a process for accumulating the information on the charging requirement amount and the discharging requirement amount of all the charging and discharging apparatuses in one management device, executing the calculation by the one management device using the information, and sending/returning a calculation result to all the charging and discharging apparatuses. Thus, it is expected that a calculation processing load or the communication load required to control the charging execution amount or the discharging execution amount of each charging and discharging apparatus is reduced to a large extent, and confidentiality of information is easily managed. Further, an advantageous effect of the method and the system according to the present disclosure can be obtained even when the number of charging and discharging apparatuses connected to the power grid is increased, and thus, with the spread of electrically driven vehicles in the future, the method and the system according to the present disclosure are expected to be used advantageously in a situation where the number of EVPSs installed within the micro grid is expected to be excessively increased.

Other purposes and advantageous effects of the present disclosure will be apparent from the following description of embodiments of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1A:
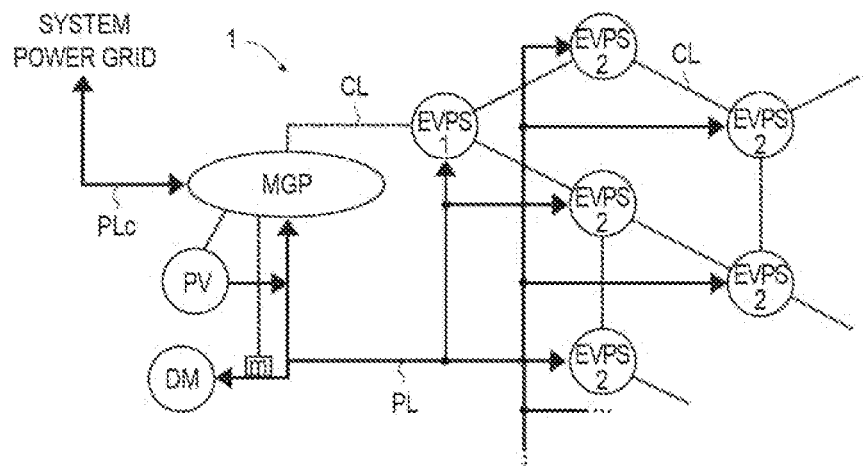
FIG. 1A is a diagram schematically illustrating a configuration of a power transmission and distribution system to which the present embodiment is applied.

Some embodiments of the present disclosure will be described in detail with reference to the accompanying drawings below. In the drawings, like reference signs denote like elements.

Configuration of Power Transmission and Distribution System

With reference to FIG. 1A, a control method and a control system according to the present embodiment is advantageously applied to a power transmission and distribution system 1 that executes a transmission and distribution control of power in a power grid, that is, a so-called "micro grid", which transmits and distributes power in a relatively small area. In the power transmission and distribution system 1, a power grid PL is arranged in a provider MGP that manages power or a power amount flowing within the micro grid, in a power generation facility PV, such as a solar power generation facility, in a power demanding facility DM that consumes power, and the like, to achieve transmission and receiving of power. Usually, a plurality of power demanding facilities DMs is connected to the power grid PL at various places, but is schematically indicated by DM in each of the drawings. Further, there may be a plurality of power generation facilities PVs. Further, the power grid PL is also connected to a system power grid, which is a centralized-type power grid that supplies power from a large-scale power plant, via a power grid PLc from the provider MGP, and is configured to achieve receiving and supply of power between the micro grid and the system power grid, as well. Further, in the power transmission and distribution system 1, as described in the "BACKGROUND" and the "SUMMARY", with the spread of electrically driven vehicles in recent years, charging and discharging apparatuses EVPSs that charge and discharge storage batteries of electrically driven vehicles are provided in various places. In these EVPSs, by connecting chargers-dischargers to the power grid PL and connecting the storage batteries of electrically driven vehicles to the chargers-dischargers, it is possible to charge the storage batteries with power from the power grid PL or discharge the storage batteries by transferring power to the power grid PL.

In the power transmission and distribution system 1, the provider MGP is configured to manage a power amount generated by the power generation facility PV and fed into the micro grid, and a power amount received from the system power grid (a feeding power amount) such that a power amount required for the power demanding facility DM is covered. For this reason, the provider MGP is provided with a communication network CL used for receiving information on a power generation amount of the power generation facility PV or a value obtained by measuring a power amount consumed at the power demanding facility DM (a demand power amount) with a measuring instrument, such as a smart meter m. Further, in order to manage a charging execution amount and a discharging execution amount of each EVPS, the system 1 is provided with a communication network CL used for transferring information, such as requirement amounts of charging and discharging (a charging requirement amount, a discharging requirement amount) of the charger-discharger in each EVPS, between each EVPS and the provider MGP. As described below in more detail, the communication network between the provider MGP and each EVPS is configured such that the provider MGP can communicate with at least one EVPS, and each EVPS can communicate with at least one other EVPS in order to implement the method or the system according to the present embodiment. Specifically, each EVPS is configured to be able to communicate with all of the other EVPSs either directly or via another EVPS, and the provider MGP is configured to be able to communicate with all of the EVPSs either directly or via at least one EVPS. The communication network CL may be a wired or wireless communicator.

Control Configuration of Charging and Discharging Limit Amount in EVPS (Charging and Discharging Apparatus) and Provider (Management Device)

In the embodiment, as described below in more detail, a control of a chargeable power amount and a dischargeable power mount in each charger-discharger of each of the EVPSs connected to the power transmission and distribution system 1 is executed. Specifically, such a control may be achieved by adjusting a limit amount on the charging execution amount and a limit amount on the discharging execution amount of the charger-discharger of each EVPS. For this reason, in each EVPS, and further, in the provider, a configuration used for controlling the limit amount on the charging execution amount and the limit amount on the discharging execution amount of each EVPS is provided as follows. A configuration and an operation of each part of FIGS. 1B and 1C described below may be implemented by an operation according to programs of computer devices provided as control devices in each EVPS and the provider. The computer device may include a drive circuit and a computer having a CPU, a ROM, a RAM, and an input/output port device connected to each other by a bidirectional common bus in the usual form.

Figure 1B:
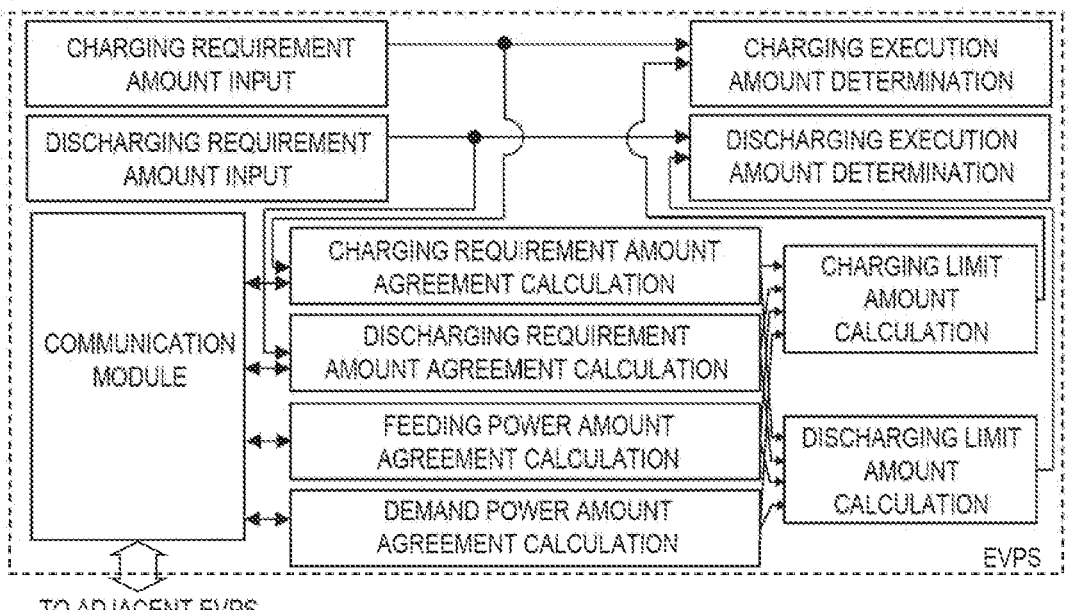
FIG. 1B is a diagram illustrating a configuration in which charging and discharging limit amounts of a charging and discharging apparatus (an EVPS) in the present embodiment is controlled in the form of a block diagram.

Specifically, first, with reference to FIG. 1B, each EVPS may be provided with a charging requirement amount input unit, a discharging requirement amount input unit, a charging requirement amount agreement calculation unit, a discharging requirement amount agreement calculation unit, a feeding power amount agreement calculation unit, a demand power amount agreement calculation unit, a charging limit amount calculation unit, a discharging limit amount calculation unit, a charging execution amount determination unit, a discharging execution amount determination unit, and a communication module. The charging requirement amount input unit and the discharging requirement amount input unit are respectively configured to receive inputs of a charging requirement amount and a discharging requirement amount for the storage battery connected to the charger-discharger, by a user of the EVPS or based on a storage state of the storage battery connected to the charger-discharger. In each EVPS, when a significant value is given to the charging requirement amount, the discharging requirement amount becomes zero, and when a significant value is given to the discharging requirement amount, the charging requirement amount becomes zero. As described below, the charging requirement amount agreement calculation unit, the discharging requirement amount agreement calculation unit, the feeding power amount agreement calculation unit, and the demand power amount agreement calculation unit are respectively configured to send and receive, between adjacent agents (EVPSs or the provider) via the communication module, information on the charging requirement amount, the discharging requirement amount, a planned value of the feeding power amount presented by the provider (a sum of the power generation amount of the power generation facility PV and the power receiving amount from the system power grid), and the demand power amount of each charger-discharger and calculates, as agreement values, values obtained by dividing, by the number of all agents, a total of the charging requirement amounts of all of the chargers-dischargers, a total of the discharging requirement amounts of all of the chargers-dischargers, the planned values of the feeding power amounts (the sum of the power generation amount of the power generation facility PV and the receiving amount from the system power grid), and the demand power amounts, respectively, using a method of an average agreement calculation of a multi-agent system having EVPSs and the provider MGP as agents. The charging limit amount calculation unit and the discharging limit amount calculation unit are respectively configured to calculate a limit amount on the charging execution amount (a charging limit amount) and a limit amount on the discharging execution amount (a discharging limit amount) using the agreement values obtained by the charging requirement amount agreement calculation unit, the discharging requirement amount agreement calculation unit, the feeding power amount agreement calculation unit, and the demand power amount agreement calculation unit, respectively. Then, the charging execution amount determination unit and the discharging execution amount determination unit are respectively configured to determine the charging execution amount and the discharging execution amount so as to achieve the charging requirement amount and the discharging requirement amount within a range not exceeding the charging limit amount and the discharging limit amount.

Figure 1C:
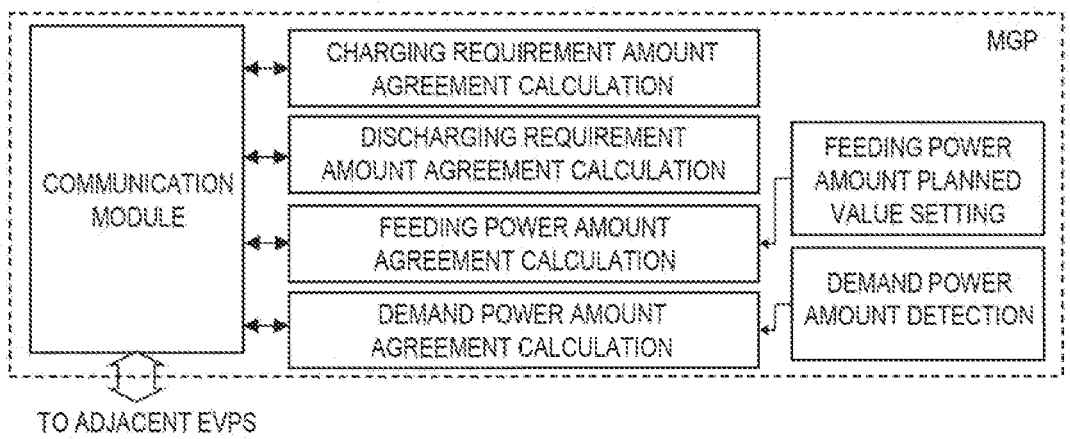
FIG. 1C is a diagram illustrating a configuration in which an average agreement calculation used for determining the charging and discharging limit amounts in a provider (MGP) of a micro grid in the present embodiment is executed in the form of a block diagram.

On the other hand, with reference to FIG. 1C, the provider MGP may be provided with a feeding power amount planned value setting unit, a demand power amount detection unit, a charging requirement amount agreement calculation unit, a discharging requirement amount agreement calculation unit, a feeding power amount agreement calculation unit, a demand power amount agreement calculation unit, and a communication module. The feeding power amount planned value setting unit is configured to set the planned value of the feeding power amount, determined in advance by the provider MGP using any method. As already described, the demand power amount detection unit is configured to detect the value obtained by measuring a consumption power amount in the power demanding facility DM in the micro grid with a smart meter or the like. In the same manner as the corresponding units provided in the EVPS, the charging requirement amount agreement calculation unit, the discharging requirement amount agreement calculation unit, the feeding power amount agreement calculation unit, and the demand power amount agreement calculation unit are configured to send and receive, between adjacent agents (EVPSs) via the communication module, information on the charging requirement amount and the discharging requirement amount, the planned value of the feeding power amount presented by the provider, and the demand power amount of each charger-discharger, and calculate respective agreement values, using the method of the average agreement calculation of the multi-agent system. The feeding power amount planned value is presented by the feeding power amount planned value setting unit, and the demand power amount is presented by the demand power amount detection unit.

Control Processing Procedures for Charging Limit Amount and Discharging Limit Amount of Charging and Discharging Apparatus (EVPS)

(1) Management of Power Amount in Power Grid PL which is Micro Grid

In the power transmission and distribution system 1, the provider MGP manages the power amount flowing in the power grid PL which is the micro grid such that the power amount flowing in the power grid PL satisfies a predetermined condition (a management condition) so as to stabilize the power amount flowing within the power grid PL and not to influence the stability of power of the system power grid connected to the power grid PL. More specifically, as one management condition, for example, a condition in which the sum of the power amount generated by the power generation facility PV and the power amount received from the system power grid, fed into the power grid PL (the feeding power amount) is managed so as to be within an appropriately set error range with respect to the planned value set in advance may be set. In other words, a condition in which the feeding power amount $P_{act}$ into the power grid PL is managed so as to satisfy the following conditions with respect to the planned value $P_{plan}$ may beset:

[Formula 1]

$$\frac{100-a}{100}P_{plan} \leq P_{act} \leq \frac{100+a}{100}P_{plan} \quad (1)$$

Here, a (%) is a permissible error for the feeding power amount Pa with respect to the planned value $P_{plan}$.

Further, as another management condition, a condition in which the supply-demand balance in the power grid PL is kept within a predetermined range may be set. In particular, when a supply-demand balance b is defined as:

(a power amount consumed in or absorbed into the micro grid)/(a power amount fed into or released from the micro grid), the supply-demand balance b may be managed to satisfy the following condition:

$$b_{low} \leq b \leq b_{high} \quad (2)$$

Here, $b_{low}$ and $b_{high}$ are a permissible lowest limit value and a permissible highest limit value for the supply-demand balance b, respectively. For the sake of simplicity, when it is assumed that a permissible error for b is the same as a (%) in the equation (1), a condition of an equation (2) is as follows:

[Formula 2]

$$\frac{100-a}{100} \leq b \leq \frac{100+a}{100} \quad (2a)$$

Further, in the power transmission and distribution system 1 according to the present embodiment, some of the plurality of EVPSs absorb power from the power grid PL by charging the storage battery, and the other of the plurality of EVPSs release power to the power grid PL by discharging the storage battery. In that case, using the feeding power amount $P_{act}$, a demand power amount $P_{Demand}$, and a charging requirement amount $P_i^{Chg}$ and a discharging requirement amount $P_i^{Dis}$ of each EVPS, the supply-demand balance b is expressed as follows:

[Formula 3]

$$b = \frac{P_{Demand} + \sum_{i=1}^{N} P_i^{Chg}}{P_{act} + \sum_{j=j}^{N} P_j^{Dis}} \quad (2b)$$

Here, N is the number of EVPSs connected to the power grid PL.

(2) Setting of Charging Limit Amount and Discharging Limit Amount of Charging and Discharging Apparatus (EVPS)

As described above, in the power transmission and distribution system 1, the charger-discharger of each EVPS connects the storage battery (not shown) connected thereto to the power grid PL, and charges and discharges the storage battery. As already described in the "BACKGROUND" and the "SUMMARY", when charging and discharging of each charger-discharger are executed indefinitely, the power of the power grid PL may become unstable, and further, the system power grid to which the power grid PL is connected may also be influenced. In order to avoid such a situation, the limit amount on the charging execution amount (the charging limit amount) or the limit amount on the discharging execution amount (the discharging limit amount) of the charger-discharger of each EVPS is set.

Specifically, the charging limit amount is set such that a permissible charging execution amount of each EVPS becomes larger as a total of power amounts available for charging within the power grid PL is larger. Then, when the discharging requirement amount of all of the EVPSs becomes large, the total of the power amounts available for charging within the power grid PL becomes large, and thus, in the end, the permissible charging execution amount of each EVPS, that is, the charging limit amount, may be set to be larger as the discharging requirement amount of all of the EVPSs is larger. Further, the power amount that can be allocated to each EVPS becomes smaller as the charging amount required within the power grid PL (the charging requirement amount) is larger, and thus, the permissible charging execution amount of each EVPS, that is, the charging limit amount, may be set to be smaller. Then, here, when it is assumed that the permissible charging execution amount allocated to each EVPS is distributed in proportion to the charging requirement amount of each EVPS, the charging limit amount may be set as follows:

(a charging requirement amount of each EVPS $P_i^{Chg}$)×(a chargeable power amount within the power grid PL)/(a total of charging requirement amounts of all EVPSs within the power grid PL) (3)

In the equation (3), the chargeable power amount within the power grid PL is expressed as follows:

[Formula 4]

$$\overline{P}_{plan} - P_{Demand} + \sum_{i=1}^{N} P_i^{Dis} \quad (2b)$$

Here,

[Formula 5]

$$\overline{P}_{plan} = \frac{100+a}{100}P_{plan} \quad (3b)$$

Therefore, the charging limit amount $P_i^{ChgLimit}$ of each EVPS may be expressed as follows:

[Formula 6]

When $\sum P_i^{Chg} > 0$, $$P_i^{ChgLimit} = P_i^{Chg} \frac{\overline{P}_{plan} - P_{Demand} + \sum_{i=1}^{N} P_i^{Dis}}{\sum_{i=1}^{N} P_i^{Chg}} \quad (3c)$$

(When $\sum P_i^{Chg}=0$, $P_i^{ChgLimit}$ is set to be zero.)

The discharging limit amount is set such that a permissible discharging execution amount of each EVPS becomes larger as a surplus of power amounts dischargeable within the power grid PL becomes larger. Then, when the charging requirement amounts of all of the EVPSs become large, the surplus of the power amounts dischargeable within the power grid PL becomes large, and thus, in the end, the permissible discharging execution amount of each EVPS, that is, the discharging limit amount, may be set to be larger as the charging requirement amounts of all of the EVPSs is larger. Further, the power amount that can be allocated to each EVPS becomes smaller as the discharging amount required within the power grid PL (the discharging requirement amount) is larger, and thus, the permissible discharging execution amount of each EVPS, that is, the discharging limit amount, may be set to be smaller. Then, here, when it is assumed that the permissible discharging execution amount allocated to each EVPS is distributed in proportion to the discharging requirement amount of each EVPS, the discharging limit amount may be set as follows:

(a discharging requirement amount of each EVPS $P_i^{Dis}$)×(a dischargeable power amount within the power grid PL)/(a total of discharging requirement amounts of all of the EVPSs within the power grid PL)     (4)

However, when the discharging limit amount is set, in order to comply with the management conditions, it is necessary to satisfy the supply-demand balance b of the equation (2a). Thus, the dischargeable power amount $\Sigma P_i^{DisLimit}$ within the power grid PL may be set so as to satisfy the following condition:

[Formula 7]

$$b = \frac{P_{Demand} + \sum_{i=1}^{N} P_i^{Chg}}{P_{act} + \sum_{i=1}^{N} P_i^{Dis}} > \frac{P_{Demand} + \sum_{i=1}^{N} P_i^{Chg}}{P_{act} + \sum_{i=1}^{N} P_i^{DisLimit}} = \frac{100-a}{100} \quad (4a)$$

Then, the dischargeable power amount $\Sigma P_i^{DisLimit}$ within the power grid PL is expressed as follows:

[Formula 8]

$$\sum_{i=1}^{N} P_i^{DisLimit} = \frac{100}{100-a}\left(P_{Demand} + \sum_{i=1}^{N} P_i^{Chg} - \underline{P}_{plan}\right) \quad (4b)$$

Here,

[Formula 9]

$$\underline{P}_{plan} = \frac{100-a}{100} P_{plan} \quad (4c)$$

Therefore, so as not to be negative, the discharging limit amount $P_i^{DisLimit}$ may be expressed as follows:

[Formula 10]

When $\sum P_i^{Dis} > 0$, $$P_i^{DisLimit} = \max\left(\frac{\frac{100}{100-a}\left(P_{Demand} + \sum_{i=1}^{N} P_i^{Chg} - \underline{P}_{plan}\right)}{\sum_{i=1}^{N} P_i^{Dis}}, 0\right) \quad (4d)$$

(When $\Sigma P_i^{Dis}=0$, $P_i^{DisLimit}$ is set to be zero.)

(3) Calculation of Agreement Value by Average Agreement Calculation of Multi-Agent System The charging limit amount and the discharging limit amount of each EVPS can be calculated in each EVPS when the feeding power amount planned value $P_{plan}$, the demand power amount $P_{Demand}$, and the total of charging requirement amounts $\Sigma P_i^{Chg}$ and the total of discharging requirement amounts $\Sigma P_i^{Dis}$ of all of the chargers-dischargers are obtained. As already described, regarding this point, in the communication network between the EVPS and the provider MGP, the EVPS and the provider MGP compose the multi-agent system as agents, and each EVPS and the provider MGP execute a calculation for updating the state quantity of an agent itself while referring to the average agreement calculation of the multi-agent system having each of the feeding power amount planned value $P_{plan}$, the demand power amount $P_{Demand}$, the charging requirement amount $P_i^{Chg}$, the discharging requirement amount $P_i^{Dis}$ as state quantities, that is, the state quantity of the adjacent agent, so as to reduce a difference between the state quantity of the agent itself and the state agent of the adjacent agent. As such, each EVPS and the provider MGP can respectively and independently obtain values obtained by dividing the feeding power amount planned value $P_{plan}$, the demand power amount $P_{Demand}$, and the total of charging requirement amounts $\Sigma P_i^{Chg}$ and the total of the discharging requirement amounts $\Sigma P_i^{Dis}$ of all of the chargers-dischargers by the number of all agents, respectively. Then, it is possible to obtain the values obtained by dividing respective numerators and denominators of the formulas (3c) and (4d) by the number of all agents. Since the number of all agents is a divisor in both the calculated values corresponding to the numerators and denominators, the number of all agents is erased in the charging limit amount and the discharging limit amount of each EVPS, and in the end, each EVPS can calculate the charging limit amount and the discharging amount, respectively using the processing of the average agreement calculation of the multi-agent system.

In the average agreement calculation processing of the multi-agent system according to the present embodiment, specifically, the calculation may be executed for each of the variables of the following state vector qi:

$$qi=[x1,x2,x3,x4]$$

Here, "i" is 1 to N, which are signs for the EVPSs, and p, which is a sign for the provider, and x1, x2, x3, and x4 are calculated values with the feeding power amount planned value, the demand power amount, the charging requirement amount, and the discharging requirement amount as initial values, respectively. Then, the initial values of the state vector qi are expressed as follows:

$$q_p = [P_{plan}, P_{Demand}, 0, 0]$$
$$q_1 = [0, 0, P_1^{Chg}, P_1^{Dis}]$$
$$q_2 = [0, 0, P_2^{Chg}, P_2^{Dis}]$$
$$\ldots$$
$$q_N = [0, 0, P_N^{Chg}, P_N^{Dis}]$$

For each EVPS, when $P_i^{Chg}>0$, $P_i^{Dis}=0$, and when $P_i^{Dis}>0$, $P_i^{Chg}=0$. Then, when the average agreement calculation is executed using the initial value vector, the state vector qi converges to the following vector in each EVPS and the provider:

[Formula 11]

$$q_{Ave} = \left[ \frac{1}{N+1}P_{plan} \quad \frac{1}{N+1}P_{Demand} \quad \frac{1}{N+1}\sum_{i=1}^{N} P_i^{Chg} \quad \frac{1}{N+1}\sum_{i=1}^{N} P_i^{Dis} \right] \quad (5)$$

A convergence condition may be when, for example, the following condition for a minute amount ε (such as 0.01) is satisfied.

$$|x1_{k+1} - x1_k|/|x1_{k+1}| < \varepsilon \quad (5a) \ (x1_k \text{ is a state variable in a kth cycle})$$

Thus, when convergence values of the state vector qi are obtained in each EVPS and the provider, each EVPS calculates the charging limit amount or the discharging limit amount using the equations (3c) or (4d). Since the provider knows the values of $P_{plan}$ and $P_{Demand}$, the provider can detect the number N of EVPSs connected in the power grid from the convergence value of the state vector qi.

As already described, in the execution of the processing of the average agreement calculation of the multi-agent system, each EVPS and the provider may directly receive information from at least one other agent, and receive information of the other agents from the at least one agent from which the information is directly received. Therefore, in the present embodiment, the number of pieces of information received by each EVPS and the provider is significantly reduced (to at least one), as compared with a case where information is received from all of the EVPSs and the provider and calculated, such that it is expected that the load of communication processing and calculation processing will be significantly reduced.

(4) Flow of Control Processing

Figure 2:
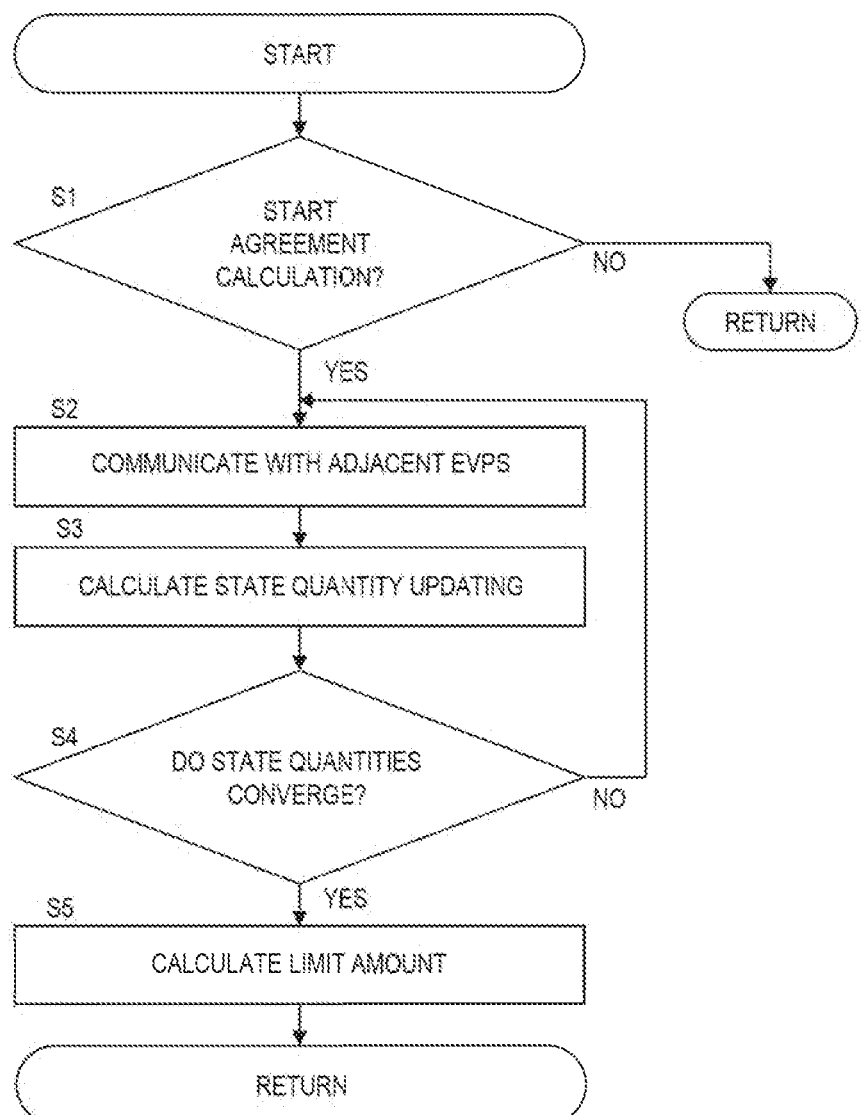
FIG. 2 is a diagram illustrating a process for determining the charging and discharging limit amounts of each EVPS of the present embodiment in the form of a flowchart.

In the control processing of the charging limit amount and the discharging limit amount of each EVPS, the average agreement calculation of the multi-agent system may be executed in a timely manner such that the charging limit amount and the discharging limit amount of each EVPS are updated. In the control processing with reference to FIG. 2, specifically, first, whether to start the agreement calculation processing is determined (step 1), and when a condition for starting the processing is satisfied, the agreement calculation processing is started. The agreement calculation processing may be repeatedly started at, for example, every elapsed predetermined time interval, which may be arbitrarily set, every time the number of EVPSs in the power grid or the number of EVPSs connected to the storage battery is changed, or every time the charging requirement amount or the discharging requirement amount of the EVPS is changed. When the agreement calculation processing is started, first, sending and receiving the state vector value is executed with the adjacent EVPS (the adjacent EVPS may be an EVPS or an MGP that directly communicates with each other, and does not necessarily have to be a distantly adjacent EVPS or MGP) (step 2). Next, using the received state vector value, a calculation for updating its own state vector value is executed such that a difference between its own state vector value and the received state vector value is reduced (step 3). Thus, whether the obtained updated state vector value satisfies the convergence condition (5a) is determined (step 4), and steps 2 to 4 are repeated until the convergence condition (5a) is satisfied for all the variables in the state vector. Then, when the convergence condition (5a) is satisfied, the charging limit amount and the discharging limit amount of each charger-discharger are calculated using the equations (3c), (4d), and the like.

As described above, when the charging limit amount or the discharging limit amount is calculated in each EVPS, it is compared with the charging requirement amount or the discharging requirement amount, the smaller value is selected as the execution amount, and the storage battery is charged and discharged.

Calculation Example

Figure 3A:
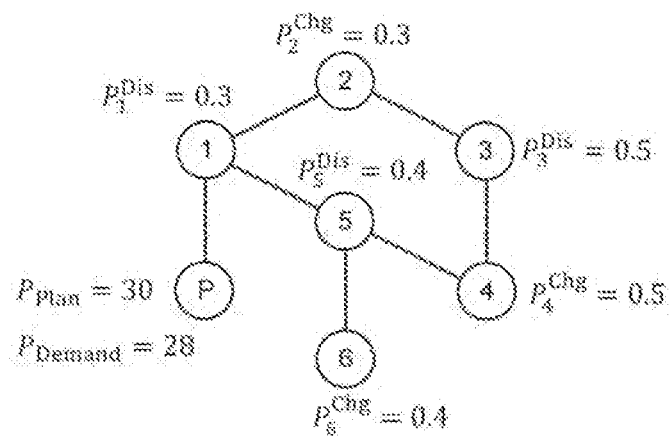
FIG. 3A is a diagram illustrating a graph set in a calculation example of the average agreement calculation of a multi-agent system in the system of FIG. 1A.
Figure 3B:
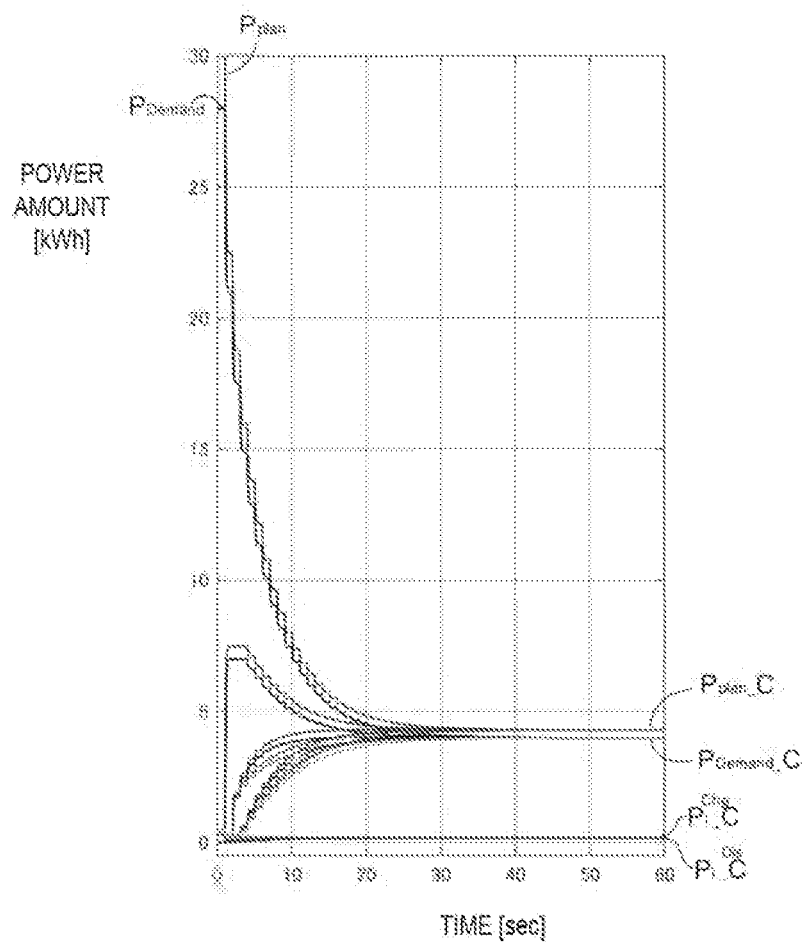
FIG. 3B is a diagram illustrating changes of each element value of a state vector over time when the average agreement calculation is executed in the graph of FIG. 3A.
Figure 4A:
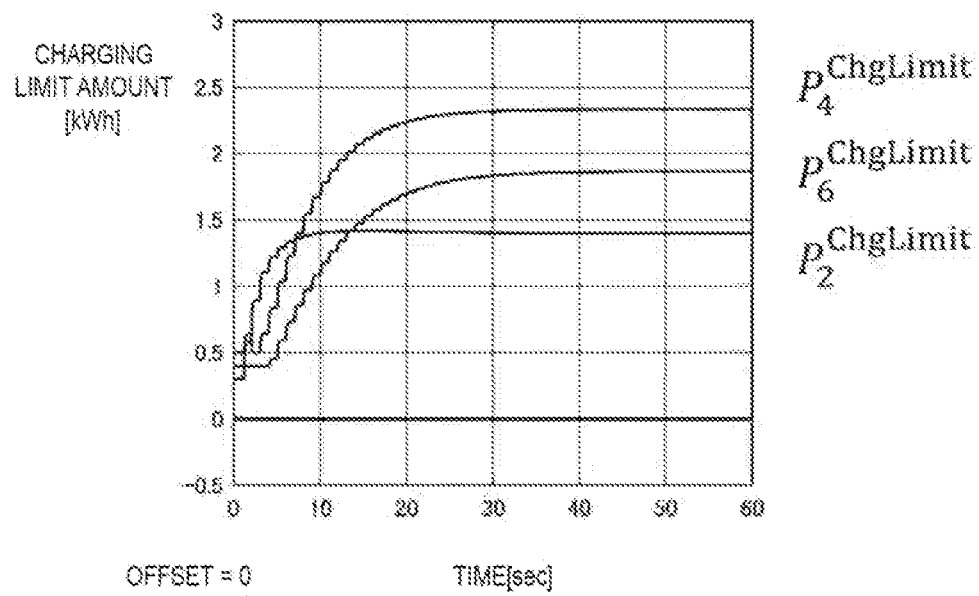
FIG. 4A is a diagram illustrating changes of a limit amount on a charging execution amount over time calculated using each element value of the state vector of FIG. 3B.
Figure 4B:
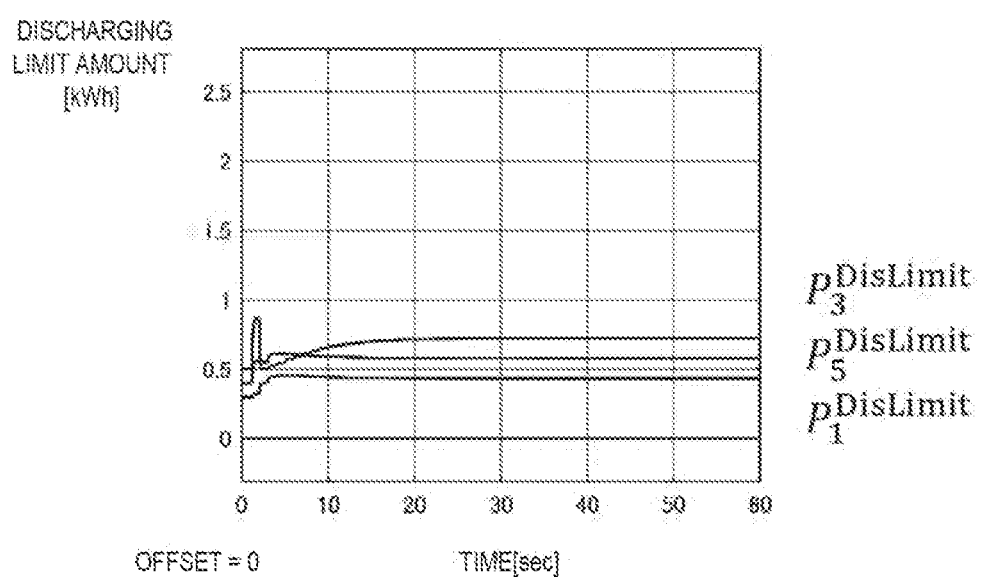
FIG. 4B is a diagram illustrating changes of a limit amount on a discharging execution amount over time calculated using each element value of the state vector of FIG. 3B.

In the EVPS and the provider composing the graph exemplified in FIG. 3A, initial values are given as illustrated in FIG. 3A, and a simulation of the average agreement calculation of the multi-agent system is executed. FIG. 3B illustrates changes in the state vectors of the feeding power amount planned value $P_{plan}$, the demand power amount $P_{Demand}$, the charging requirement amount $P_i^{Chg}$, and the discharging requirement amount $P_i^{Dis}$. As illustrated in FIG. 3B, it is confirmed that all the feeding power amount planned amount, the demand power amount, the charging requirement amount, and the discharging requirement amount reach the agreement values $P_{plan\_}C$, $P_{demand\_}C$, $P^{Chg}\_C$, and $P^{Dis}\_C$, respectively. Further, FIGS. 4A and 4B illustrate the charging limit amount $P_i^{ChgLimit}$ and the discharging limit amount $P_i^{DisLimit}$ that are calculated using the agreement values. As illustrated in FIGS. 4A and 4B, both the charging limit amount $P_i^{ChgLimit}$ and the discharging limit amount are stable at constant values. As such, it is illustrated that it is possible to calculate the charging limit amount and the discharging limit amount of each charger-discharger using the method according to the present embodiment.

Although the above description has been made in association with the embodiments of the present disclosure, many modifications and changes can be easily made by those skilled in the art, it will be clear that the present disclosure is not limited only to the above-exemplified embodiments, but can be applied to various devices without departing from the concept of the present disclosure.

The charging and discharging apparatus used in the present embodiment is not limited to the EVPS, and may be an apparatus that can charge and discharge a storage battery in any form of the power grid.

What is claimed is:

1. A method of controlling a chargeable power amount and a dischargeable power amount in each of charging and discharging apparatuses included in a power transmission and distribution system, wherein:
    the power transmission and distribution system includes a power grid and a plurality of charging and discharging apparatuses connected to the power grid;
    each of chargers and dischargers of the charging and discharging apparatuses is configured to, when being connected to a storage battery, charge the storage battery with power from the power grid or discharge the storage battery by transferring power to the power grid;
    the power transmission and distribution system includes, in each of the charging and discharging apparatuses, a communication unit configured to receive information on a charging requirement amount and a discharging requirement amount of at least one other charging and discharging apparatus; and the method comprises:
- a process for calculating, in each of the charging and discharging apparatuses, according to an average agreement calculation of a multi-agent system having each of the charging and discharging apparatuses as an agent, agreement values obtained by dividing, by the number of agents, a total of charging requirement amounts and a total of discharging requirement amounts of all of the charging and discharging apparatuses connected to the power grid, respectively, using an own charging requirement amount and an own discharging requirement amount and information on the charging requirement amount and the discharging requirement amount of the at least one other charging and discharging apparatus acquired by the communication unit; and
- a process for controlling, in each of the charging and discharging apparatuses, a limit amount on a charging execution amount and a limit amount on a discharging execution amount of each of the charging and discharging apparatuses based on the agreement values of the charging requirement amounts and the discharging requirement amounts.

2. The method according to claim 1, wherein:
in the process for controlling the limit amount on the charging execution amount and the limit amount on the discharging execution amount of each of the charging and discharging apparatuses,
the limit amount on the charging execution amount of each of the charging and discharging apparatuses is set to be smaller when the agreement value of the charging requirement amounts of all of the charging and discharging apparatuses is large than when the agreement value of the charging requirement amounts of all of the charging and discharging apparatuses is small; and
the limit amount on the charging execution amount of each of the charging and discharging apparatuses is set to be larger when the agreement value of the discharging requirement amounts of all of the charging and discharging apparatuses is large than when the agreement value of the discharging requirement amounts of all of the charging and discharging apparatuses is small.

3. The method according to claim 1, wherein:
in the process for controlling the limit amount on the charging execution amount and the limit amount on the discharging execution amount of each of the charging and discharging apparatuses,
the limit amount on the discharging execution amount of each of the charging and discharging apparatuses is set to be larger when the agreement value of the charging requirement amounts of all of the charging and discharging apparatuses is large than when the agreement value of the charging requirement amounts of all of the charging and discharging apparatuses is small; and
the limit amount on the discharging execution amount of each of the charging and discharging apparatuses is set to be smaller when the agreement value of the discharging requirement amounts of all of the charging and discharging apparatuses is large than when the agreement value of the discharging requirement amounts of all of the charging and discharging apparatuses is small.

4. The method according to claim 1, wherein, in the process for controlling the limit amount on the charging execution amount and the limit amount on the discharging execution amount of each of the charging and discharging apparatuses, the limit amount on the charging execution amount and the limit amount on the discharging execution amount of each of the charging and discharging apparatuses are controlled such that a management condition for a power amount flowing in the power grid is satisfied.

5. The method according to claim 4, wherein:
the power transmission and distribution system includes a management device configured to manage the power amount in the power grid;
the management device is configured to set a planned value of a feeding power amount fed into the power grid from at least one of a power generation facility or a system power grid that supplies power to the power grid; and
in the process for controlling the limit amount on the charging execution amount and the limit amount on the discharging execution amount of each of the charging and discharging apparatuses, the limit amount on the charging execution amount and the limit amount on the discharging execution amount of each of the charging and discharging apparatuses are controlled such that a management condition in which the feeding power amount is set with respect to the planned value is satisfied.

6. The method according to claim 5, wherein:
the management device is configured to detect a demand power amount in the power grid; and
in the process for controlling the limit amount on the charging execution amount and the limit amount on the discharging execution amount of each of the charging and discharging apparatuses, the limit amount on the charging execution amount and limit amount on the discharging execution amount of each of the charging and discharging apparatuses am controlled such that a management condition set for the feeding power amount and the demand power amount is satisfied.

7. The method according to claim 5, wherein, in a process for calculating agreement values of the charging requirement amounts and the discharging requirement amounts of all of the charging and discharging apparatuses connected to the power grid, the management device is used as the agent in the average agreement calculation of the multi-agent system.

8. The method according to claim 7, wherein:
the power transmission and distribution system includes:
- a communication unit having a configuration in which the management device sends information on the planned value of the feeding power amount and a demand power amount to at least one charging and discharging apparatus; and
- in each of the charging and discharging apparatuses, a communication unit configured to receive the information on the planned value of the feeding power amount and the demand power amount from at least one other charging and discharging apparatus;

the method further comprises a process for calculating, according to an average agreement calculation of a multi-agent system having each of the charging and discharging apparatuses and the management device as the agents, agreement values obtained by dividing planned values of the feeding power amounts and the demand power amounts of each of the charging and discharging apparatuses and the management device by the number of agents, respectively; and
in the process for controlling the limit amount on the charging execution amount and the limit amount on the discharging execution amount of each of the charging and discharging apparatuses, in each of the charging and discharging apparatuses, the limit amount on the charging execution amount and the limit amount on the discharging execution amount of each of the charging and discharging apparatuses are controlled based on the agreement values of the charging requirement amounts and the discharging requirement amounts and the agreement values of the planned values of the feeding power amounts and the demand power amounts.

9. The method according to claim 1, wherein, in the process for controlling the limit amount on the charging execution amount and the limit amount on the discharging execution amount of each of the charging and discharging apparatuses, the limit amount on the charging execution amount of each of the charging and discharging apparatuses is set as follows:

> (a charging requirement amount of each of the charging and discharging apparatuses)×(the chargeable power amount within the power grid)/(the total of the charging requirement amounts of all of the charging and discharging apparatuses within the power grid).

10. The method according to claim 1, wherein, in the process for controlling the limit amount on the charging execution amount and the limit amount on the discharging execution amount of each of the charging and discharging apparatuses, the limit amount on the discharging execution amount of each of the charging and discharging apparatuses is set as follows:

> (a discharging requirement amount of each of the charging and discharging apparatuses)×(the dischargeable power amount within the power grid)/(the total of the discharging requirement amounts of all of the charging and discharging apparatuses within the power grid).

11. A system of controlling a chargeable power amount and a dischargeable amount in each of charging and discharging apparatuses included in a power transmission and distribution system, wherein:
the power transmission and distribution system includes a power grid and a plurality of charging and discharging apparatuses connected to the power grid;
each of chargers and dischargers of the charging and discharging apparatuses is configured to, when being connected to a storage battery, charge the storage battery with power from the power grid or discharge the storage battery by transferring power to the power grid;
the power transmission and distribution system includes, in each of the charging and discharging apparatuses, a communication unit configured to receive information on a charging requirement amount and a discharging requirement amount of at least one other charging and discharging apparatus; and
the system comprises, in each of the charging and discharging apparatuses:
a requirement amount agreement value calculation unit configured to calculate, according to an average agreement calculation of a multi-agent system having each of the charging and discharging apparatuses as an agent, agreement values obtained by dividing, by the number of agents, a total of charging requirement amounts and a total of discharging requirement amounts of all of the charging and discharging apparatuses connected to the power grid, respectively, using an own charging requirement amount and an own discharging requirement amount and information on the charging requirement amount and the discharging requirement amount of the at least one other charging and discharging apparatus acquired by the communication unit; and
a charging and discharging limit amount control unit configured to control a limit amount on a charging execution amount and a limit amount on a discharging execution amount of each of the charging and discharging apparatuses based on the agreement values of the charging requirement amounts and the discharging requirement amounts.

12. The system according to claim 11, wherein the charging and discharging limit amount control unit is configured to:
set the limit amount on the charging execution amount of each of the charging and discharging apparatuses to be smaller when the agreement value of the charging requirement amounts of all of the charging and discharging apparatuses is large than when the agreement value of the charging requirement amounts of all of the charging and discharging apparatuses is small; and
set the limit amount on the charging execution amount of each of the charging and discharging apparatuses to be larger when the agreement value of the discharging requirement amounts of all of the charging and discharging apparatuses is large than when the agreement value of the discharging requirement amounts of all of the charging and discharging apparatuses is small.

13. The system according to claim 11, wherein the charging and discharging limit amount control unit is configured to:
set the limit amount on the discharging execution amount of each of the charging and discharging apparatuses to be larger when the agreement value of the charging requirement amounts of all of the charging and discharging apparatuses is large than when the agreement value of the charging requirement amounts of all of the charging and discharging apparatuses is small; and
set the limit amount on the discharging execution amount of each of the charging and discharging apparatuses to be smaller when the agreement value of the discharging requirement amounts of all of the charging and discharging apparatuses is large than when the agreement value of the discharging requirement amounts of all of the charging and discharging apparatuses is small.

14. The system according to claim 11, wherein the charging and discharging limit amount control unit is configured to control the limit amount on the charging execution amount and the limit amount on the discharging execution amount of each of the charging and discharging apparatuses such that a management condition for a power amount flowing in the power grid is satisfied.

15. The system according to claim 14, wherein:
the power transmission and distribution system includes a management device configured to manage the power amount in the power grid;
the management device is configured to set a planned value of a feeding power amount fed into the power grid from at least one of a power generation facility or a system power grid that supplies power to the power grid; and
the charging and discharging limit amount control unit is configured to control the limit amount on the charging execution amount and the limit amount on the discharging execution amount of each of the charging and discharging apparatuses such that a management condition in which the feeding power amount is set with respect to the planned value is satisfied.

16. The system according to claim 15, wherein:
the management device is configured to detect a demand power amount in the power grid; and
the charging and discharging limit amount control unit is configured to control the limit amount on the charging execution amount and limit amount on the discharging execution amount of each of the charging and discharging apparatuses such that a management condition set for the feeding power amount and the demand power amount is satisfied.

17. The system according to claim 15, wherein the requirement amount agreement value calculation unit is configured to use the management device as the agent in the average agreement calculation of the multi-agent system.

18. The system according to claim 17, wherein:
the power transmission and distribution system includes:
a communication unit having a configuration in which the management device sends information on the planned value of the feeding power amount and a demand power amount to at least one charging and discharging apparatus; and
in each of the charging and discharging apparatuses, a communication unit configured to receive the information on the planned value of the feeding power amount and the demand power amount from at least one other charging and discharging apparatus;
the system further comprises, in each of the charging and discharging apparatuses and the management device, a feeding power amount and demand power amount agreement value calculation unit configured to calculate, according to an average agreement calculation of a multi-agent system having each of the charging and discharging apparatuses and the management device as the agents, agreement values obtained by dividing planned values of the feeding power amounts and the demand power amounts of each of the charging and discharging apparatuses and the management device by the number of agents, respectively; and
in each of the charging and discharging apparatuses, the charging and discharging limit amount control unit is configured to control the limit amount on the charging execution amount and the limit amount on the discharging execution amount of each of the charging and discharging apparatuses based on the agreement values of the charging requirement amounts and the discharging requirement amounts and the agreement values of the planned values of the feeding power amounts and the demand power amounts.

19. The system according to claim 11, wherein the charging and discharging limit amount control unit is configured to set the limit amount on the charging execution amount of each of the charging and discharging apparatuses as follows:

(a charging requirement amount of each of the charging and discharging apparatuses)×(the chargeable power amount within the power grid)/(the total of the charging requirement amounts of all of the charging and discharging apparatuses within the power grid).

20. The system according to claim 11, wherein the charging and discharging limit amount control unit is configured to set the limit amount on the discharging execution amount of each of the charging and discharging apparatuses as follows:

(a discharging requirement amount of each of the charging and discharging apparatuses)×(the dischargeable power amount within the power grid)/(the total of the discharging requirement amounts of all of the charging and discharging apparatuses within the power grid).

* * * * *